UNITED STATES PATENT OFFICE.

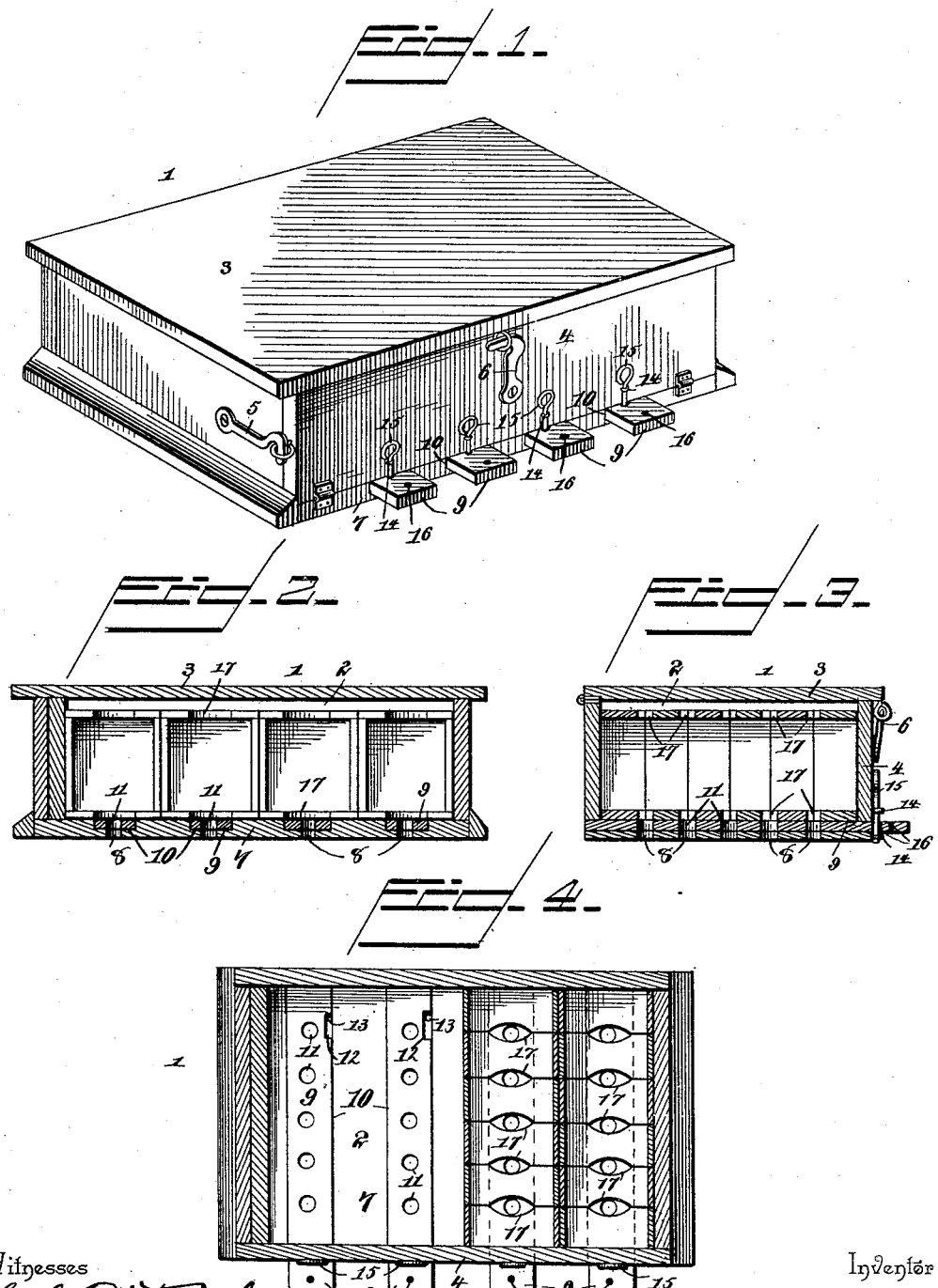

GEORGE C. FERGUSON, OF ODELL, NEBRASKA.

BEE-HIVE.

SPECIFICATION forming part of Letters Patent No. 452,366, dated May 19, 1891.

Application filed February 18, 1891. Serial No. 381,914. (No model.)

*To all whom it may concern:*

Be it known that I, GEORGE C. FERGUSON, a citizen of the United States, residing at Odell, in the county of Gage and State of Nebraska, have invented a new and useful Bee-Hive, of which the following is a specification.

The invention relates to improvements in bee-hives.

The object of the present invention is to provide for bee-hives an attachment adapted to receive the surplus honey and to enable the same to be readily removed and capable of controlling the bees.

The invention consists in the construction and novel combination and arrangement of parts hereinafter fully described, illustrated in the accompanying drawings, and pointed out in the claims hereto appended.

In the drawings, Figure 1 is a perspective view of a hive attachment constructed in accordance with this invention. Fig. 2 is a vertical longitudinal sectional view. Fig. 3 is a transverse sectional view. Fig. 4 is a horizontal sectional view, some of the honey-boxes being removed.

Referring to the accompanying drawings, 1 designates a box adapted to be placed on a hive to contain honey-sections 2, and provided with a hinged top 3 and a hinged front 4, which are secured in their normal or closed positions by hooks 5 and 6. The bottom 7 is provided with a series of openings 8, which are arranged to communicate with the spaces between the brood-frames of a hive to permit bees to pass through the honey-sections 2, as will be readily understood by those skilled in the art.

The box or attachment is separate from the hive-body with which it is designed to co-operate; but if found convenient it may be hinged to the body or connected therewith by hooks and eyes.

The passage of the bees is controlled by slides 9, arranged in transverse recesses 10 of the bottom 7, and the upper faces of the slides are flush with the upper face of the bottom, and the slides 9 are provided with a series of circular openings 11, adapted to register with the circular openings of the bottom of the attachment to provide a passage for bees, and the slides 9 are adapted to be moved longitudinally to close the openings in the bottom and prevent access of bees to the box or attachment. The slides are provided at their sides with recesses 12, in which are arranged screws or projections 13, extending from the bottom and limiting the longitudinal movement of the slides. The slides are locked in position to open or close the bee-passages by a pin 14, which is arranged in staples 15, and which engages openings 16 at the ends of the slides, and the staples are secured to the front 4 of the box and arranged above and below the slides.

The honey-sections are provided at the sides of their tops and bottoms with recesses 17, which enable the honey-sections to be constructed of any desired size without liability of obstructing the passage for the bees.

It will be seen that the hive attachment is simple and inexpensive in construction and adapted to be readily applied to a hive-body and is capable of controlling the bees and of admitting them to and excluding them from the honey-sections.

What I claim is—

1. An attachment for bee-hives, comprising the box having a hinged front and top and having its bottom provided in its upper surface with transverse recesses and a series of bee-openings beneath them, the perforated slides arranged in the transverse recesses and provided at their side with recesses, the projections arranged on the bottom and entering the recesses and limiting the longitudinal movement of the slides, and means for locking the slides, substantially as described.

2. An attachment for bee-hives, comprising the box having the hinged front and top and provided in its bottom with transverse recesses and a series of bee-openings beneath the recesses, the perforated slides arranged in the recesses and over the bee-openings and provided with means for limiting their longitudinal movement and having the openings 16 at their ends, the staples arranged on the outer face of the front and above and below the slides, and the pins arranged in the staples and adapted to engage said openings, substantially as described.

In testimony that I claim the foregoing as my own I have hereto affixed my signature in presence of two witnesses.

GEORGE C. FERGUSON.

Witnesses:
FLETCHER MILLER,
J. D. McGEEHON.